(No Model.)  2 Sheets—Sheet 1.

A. BAUMGARTNER.
STALK AND CANE CUTTER.

No. 318,942.  Patented June 2, 1885.

ATTEST:
Robert Burns
Thos. J. Smith

INVENTOR:
Alexander Baumgartner
per Smalley & Burns
Attorneys.

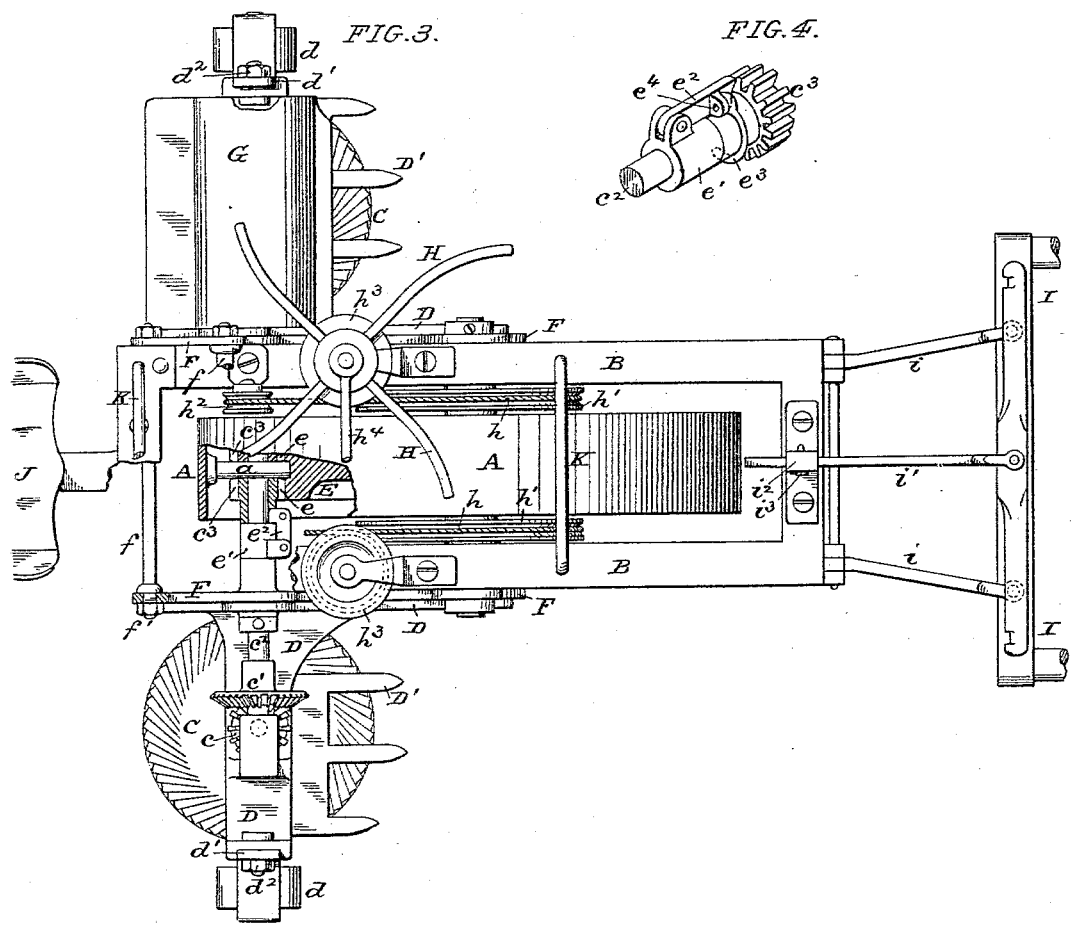

UNITED STATES PATENT OFFICE.

ALEXANDER BAUMGARTNER, OF BELLEVILLE, ILLINOIS, ASSIGNOR OF ONE-HALF TO JOHN GEORGE ORDNUNG, OF SAME PLACE.

STALK AND CANE CUTTER.

SPECIFICATION forming part of Letters Patent No. 318,942, dated June 2, 1885.

Application filed October 8, 1883. (No model.)

*To all whom it may concern:*

Be it known that I, ALEXANDER BAUMGARTNER, a citizen of the United States, and a resident of Belleville, in the county of St. Clair and State of Illinois, have invented a new and useful Improvement in Stalk and Cane Cutters; and I do hereby declare the following to be a full, clear, and exact description of the same, such as will enable those skilled in the art to which my invention appertains to make and use the same, reference being had to the accompanying drawings, forming a part of this specification.

This invention relates to improvements in that class of reaping or mowing machines in which the cutting apparatus consists of a circular revolving cutter rotated by gearing from the main axle, in connection with a revolving reel and a finger-bar provided with fingers for gathering the grain and holding it while being cut; and my invention consists of certain combinations of devices, and in the construction of parts constituting said combinations, as hereinafter described, and particularly pointed out in the claims.

My invention is directed to the production of a machine adapted to harvest two rows of standing corn at the same time by separate and independently-revolving cutters, having provision for adjustment vertically and with reference to the plane of the ground.

Figure 1:
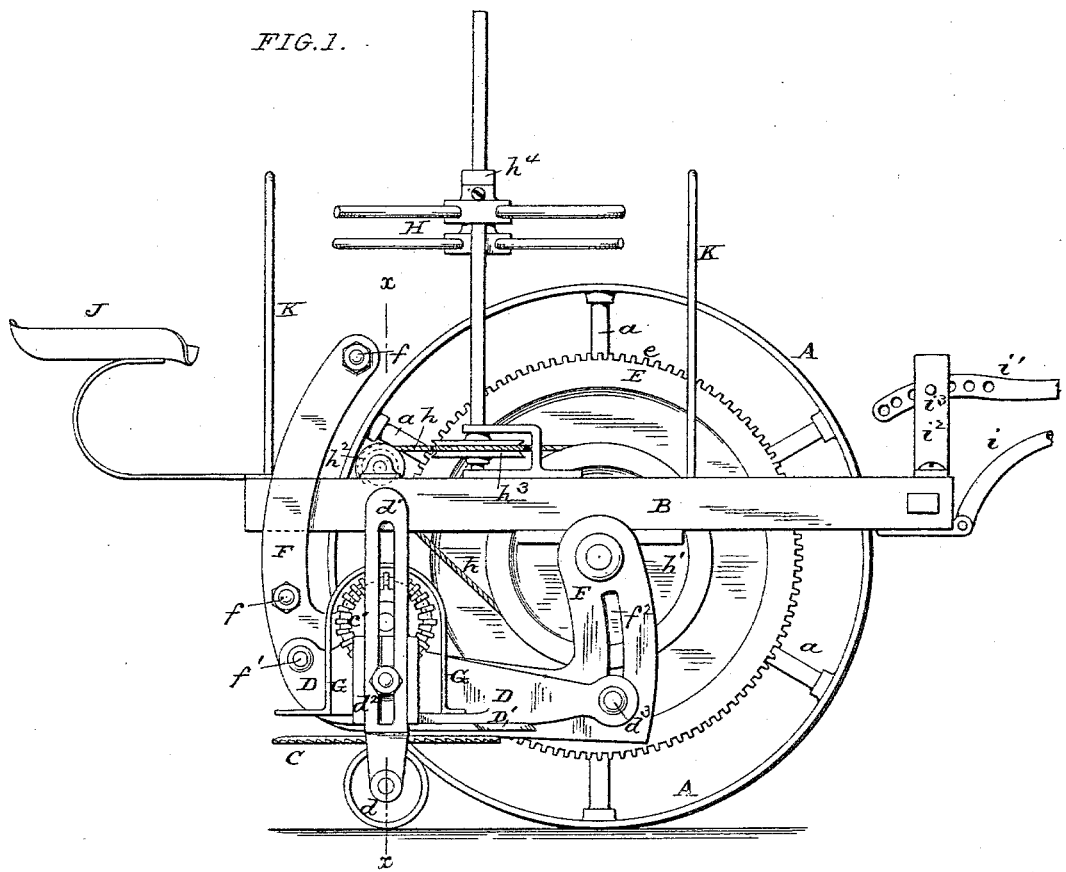
Figure 2:
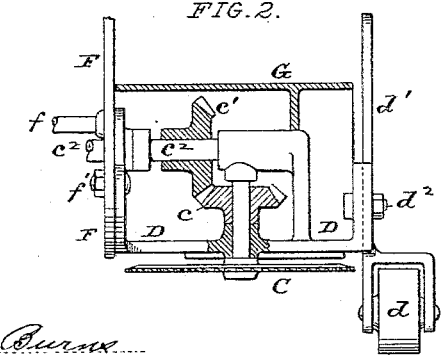

In the accompanying drawings, Figure 1 is a side elevation of my improved machine. Fig. 2 is a detail transverse section at line $x\ x$ of Fig. 1. Fig. 3 is a top plan, partly in section, and Fig. 4 is a detail perspective view of the clutch mechanism for throwing the driving counter-shaft of the circular cutter in or out of gear with the main driving-axle.

Similar letters of reference indicate like parts in the several views.

Referring to the drawings, A represents the central ground-wheel, on the axle of which is supported the main frame B.

The cutting apparatus is arranged in duplicate, as shown, so that two rows of corn or other stalks can be cut at a time, the central driving-wheel, A, running between the rows of stalks. In the present invention the cutting apparatus consists of revolving circular cutters C, supported in horizontal positions in frames D, and receiving motion through bevel-wheels $c\ c'$, counter-shafts $c^2$, and pinions $c^3$, from the main driving-gear E upon the axle of the driving-wheel. The operating-gears of the cutting apparatus are in duplicate, and operated independently by separate gear-teeth $e\ e$ of the driving-wheel E, and are capable of being thrown in or out of gear independently of each other by means of clutches $e'$ on their counter-shafts. The object of the separate gear-teeth $e\ e$ is to permit of the wheel-spokes $a$ being arranged between them, and so admit of the driving-gear being arranged centrally with the draft, and avoid any tendency to side strain or draft in the machine in use.

The clutch for the counter-shaft $c^2$, aforementioned, consists of sleeves $e'$, keyed upon said counter-shafts, and provided with hinged latch-bars $e^2$, which engage in slots in the extension-sleeves of the pinions $c^3$, (which are loose upon the counter-shafts,) to lock the parts in position, the said latch-bars being held to their engagement by the spring-hooks $e^3$, engaging around the pinion-sleeves, as shown, and having hinge-connections $e^4$, with the latch-bars $e^2$. (See Fig. 4.) But this clutch is not specifically herein claimed, and I reserve the right of making it the subject of a separate application for a patent.

The frames D, that carry the cutting apparatus, are supported at their outer ends by rollers or wheels $d$, which are made vertically adjustable, to enable the adjustment of the machine to cut at any desired height, the supporting-frames D being provided for this purpose with a slotted vertical extension, $d'$, by which it is bolted adjustably to the frame D by a bolt, $d^2$.

F is a frame, common to both of the cutter-frames, hinged to the axle of the machine, and having cross bolts or ties $f$, by which its upward or downward swing is limited. The rear ends of the cutter-frames D are hinged at $f'$ to this frame F, and at their forward ends have bolts $d^3$, moving in segmental slots $f^2$, so as to permit of vertical adjustments of such frames D in order to bring the cutters C in planes parallel with the surface of the ground.

G is a shield or casing for covering the operating-gearing of the cutting mechanism, so as to prevent the same from becoming clogged or entangled.

D' D' are the fingers, secured to the frames D, for gathering and holding the stalk while being cut.

The reel-arms H, by which the stalks are gathered, are arranged in duplicate in a horizontal position, and receive motion through an endless belt, $h$, from the driving-pulleys $h'$ on the main shaft and the guide-pulleys $h^2$ and horizontal guide-pulleys $h^3$ on the vertical shafts of the reels, as clearly indicated in Figs. 1 and 3. The purpose of the guide-pulleys $h^2$ in the above construction is to permit of the adjustment of the main frame without interfering with the transmission of motion to the reels, and at the same time change the direction of the motion received by the reels from a vertical to a horizontal.

The reel-standards are braced and tied together at their upper ends by means of the eye-bar $h^4$, as indicated in Figs. 1 and 3.

The shafts or thills I are connected by hinged curved bars $i$ to the main frame, and their adjustment is effected by means of a perforated sector-bar, $i'$, passing through a standard, $i^2$, on the main frame, and adjustably secured therein by means of a pin or bolt, $i^3$; but this thill-coupling device is not specifically herein claimed, and I reserve the right of making it the subject of a separate application for a patent.

J is the driver's seat, arranged at the rear of the machine.

K K are guards to keep the top of the grain away from the central part of the machine.

I have stated that the cutter-carrying frames D D are made adjustable, so as to bring the cutters in a plane parallel with the surface of the ground; and it will be understood that such adjustment is effected by raising or lowering the front ends of said frames at their clamping-bolt connections $d^3$, said bolts passing through the segmental slots $f^2$ in the frames F. In this adjustment the cutter-carrying frames D D swing upon the bolt $f'$ as a hinge, and are clamped to the frame F by nuts (not shown) on the bolts $d^3$ at the inner sides of the slotted arms of the frame F in a manner similar to the bolt $d^2$, which permits of the vertical adjustment of the said frames D upon the ground-roller by the slotted standards of the latter.

It will also be understood that the frames D D are separate attachments, one to each side of the frame F, by the bolts $f'$ and the adjustable clamping-bolts $d^3$, and that such frames can be adjusted independently of each other, and that their vertical adjustment can be made independently of the adjustment in the arc of a circle to bring the revolving cutters in the proper relation to the ground.

Having thus fully described my said invention, what I claim as new, and desire to secure by Letters Patent, is—

1. In a stalk-cutting machine, the combination of the main frame B, driving-wheel A, frame F, provided with the curved slots $f^2$, and frames D, pivoted to the frame F, and provided with adjusting means engaging said curved slots $f^2$, as described, and for the purpose set forth.

2. The combination of the main axle, the main frame, the frame F, pivoted to the axle and provided with the curved slots $f^2$, the frames D, pivoted to the frame F and provided with adjusting means engaging said curved slots $f^2$, the adjustable rollers $d$, and the cutting apparatus, as described, and for the purpose set forth.

3. In a stalk-cutting machine, the combination of the main axle, the main frame B, the pivoted frames F and D, the circular revolving cutters C, bevel-gears $c\ c'$, counter-shaft $c^2$, pinion $c^3$, and driving-gears E, as described, and for the purpose set forth.

4. The combination, in a corn-harvesting machine, of the main frame B and the centrally-arranged driving-wheel A, with the frame F, carried upon the axle of said wheel, and the cutter-carrying frames D D, pivoted to said frame F, and adjustably connected thereto for adjustment upon said pivots, substantially as described, for the purpose specified.

5. In a corn-harvesting machine, the combination, with the driving-wheel, the frame F, hung upon the axle thereof, and the adjustable supporting-rollers $d\ d$ for said frame, of the cutter-carrying frames D D, carried by said frame F, and made adjustable thereon in the arc of a circle, as described, and for the purpose specified.

6. The combination, in a corn-harvester, of the centrally-arranged carrying and driving wheel having the separate gears $e\ e$, with the separate side revolving cutters, each mounted upon a vertical shaft in an independent adjustable side frame, D, suitable gearing for connecting said separate revolving cutters with the separate gears of the driving-wheel, and clutch devices for separately controlling the operating-connection of each cutter, substantially as described, for the purpose specified.

7. The combination, in a corn-harvesting machine, of the separate side revolving cutters, C C, and the independent reels H, mounted upon the main frame, with separate adjustable side frames, each frame carrying a cutter, the centrally-arranged carrying and driving wheel having the separate gears $e\ e$, and operating mechanism for the separate cutters and for the separate reels, substantially as described, for the purpose specified.

8. The combination, in a corn-harvester, of the separate side revolving cutters and the independent reels H with the side frames, D D, the centrally-arranged carrying and driving wheel, and operating mechanism for the separate cutters and for the separate reels, consisting of the bevel-gears $c\ c'$, counter-shaft $c^2$, and pinion $c^3$, and the pulleys $h^3$, $h^2$, and $h'$, and their separate belt-connections $h$, substantially as described, for the purpose specified.

In testimony whereof I have hereunto set my hand.

ALEXANDER BAUMGARTNER.

In presence of—
 MARTIN MODART,
 J. GEORGE ORDNUNG.